US010624482B2

(12) United States Patent
Boak et al.

(10) Patent No.: US 10,624,482 B2
(45) Date of Patent: Apr. 21, 2020

(54) NON-SLIP CONTAINER WITH HIDDEN SUCTION CUP

(71) Applicants: Brooke Boak, Los Altos, CA (US); Stephen Boak, Los Altos, CA (US)

(72) Inventors: Brooke Boak, Los Altos, CA (US); Stephen Boak, Los Altos, CA (US)

(*) Notice: Subject to any disclaimer, the term of this patent is extended or adjusted under 35 U.S.C. 154(b) by 277 days.

(21) Appl. No.: 15/693,506

(22) Filed: Sep. 1, 2017

(65) Prior Publication Data
US 2019/0069703 A1 Mar. 7, 2019

(51) Int. Cl.
A47G 29/093 (2006.01)
B60N 3/00 (2006.01)
A47D 1/00 (2006.01)
A47G 19/10 (2006.01)
A01K 39/014 (2006.01)
A47G 23/02 (2006.01)
B65D 25/24 (2006.01)
A45C 11/36 (2006.01)
A45C 11/00 (2006.01)
A47G 29/087 (2006.01)
B60N 3/10 (2006.01)
F16B 47/00 (2006.01)

(52) U.S. Cl.
CPC .......... A47G 29/093 (2013.01); A01K 39/014 (2013.01); A45C 11/00 (2013.01); A45C 11/36 (2013.01); A47D 1/0085 (2017.05); A47G 19/10 (2013.01); A47G 23/0225 (2013.01); A47G 29/087 (2013.01); B60N 3/002 (2013.01); B60N 3/103 (2013.01); B65D 25/24 (2013.01); F16B 47/00 (2013.01)

(58) Field of Classification Search
CPC ....... A01K 39/014; A45C 11/00; A45C 11/36; A47D 1/0085; A47G 19/10; A47G 23/0225; A47G 29/087; A47G 29/093; B65D 25/24; F16B 47/00; B60N 3/002; B60N 3/103
USPC ....................................................... 220/574
See application file for complete search history.

(56) References Cited

U.S. PATENT DOCUMENTS 2,329,279 A 9/1943 Lower
2,398,060 A 4/1946 Van Alstyne
(Continued)

FOREIGN PATENT DOCUMENTS

CN 2174918 Y 8/1994
CN 2661038 Y 12/2004
(Continued)

Primary Examiner — James N Smalley
Assistant Examiner — Madison L Poos

(57) ABSTRACT

The disclosed is a non-slip container with hidden suction cup. In one aspect, a container includes a storage space, a suction cup, solid core, suction mechanism and a release tab. The solid core is placed directly above the suction cup in the storage space. The suction mechanism is positioned in a sectional gap of the container under the solid core. The suction mechanism enables the container to adhere with a surface on which the container is affixed. The release tab of the suction mechanism is accessible from the strategically placed area of the container. The release tab is positioned under the solid core and fully vertically flushes with the container. The release tab is encompassed in the sectional gap under the container. The release tab enables a user to detach the container from the surface when the release tab is lifted upward from the surface.

20 Claims, 6 Drawing Sheets

(56) References Cited

U.S. PATENT DOCUMENTS

| | | | |
|---|---|---|---|
| 2,588,990 A | 3/1952 | Sanchez | |
| 2,623,369 A * | 12/1952 | Haydu | A47G 19/10 248/362 |
| 2,969,890 A | 1/1961 | Udell | |
| 3,094,235 A | 6/1963 | Luning | |
| 4,759,525 A | 7/1988 | Cross et al. | |
| 4,908,066 A | 3/1990 | Taylor et al. | |
| 5,104,077 A | 4/1992 | Liu | |
| 6,123,220 A | 9/2000 | Williams | |
| 6,402,104 B1 | 6/2002 | Smith | |
| 6,581,541 B2 | 6/2003 | Hollinger | |
| 7,861,647 B2 | 1/2011 | So et al. | |
| 8,002,140 B2 | 8/2011 | Schantz et al. | |
| 8,231,089 B2 | 7/2012 | Mills | |
| 8,251,340 B2 | 8/2012 | Webb et al. | |
| 8,690,002 B1 | 4/2014 | Finell | |
| 9,750,358 B2 | 9/2017 | Jagger | |
| 9,930,865 B1 | 4/2018 | Hunt | |
| 10,253,803 B2 | 4/2019 | Mutch et al. | |
| 2004/0231607 A1 | 11/2004 | Hollinger | |
| 2008/0078296 A1 | 4/2008 | Wan | |
| 2008/0217493 A1 | 9/2008 | Bevirt | |
| 2010/0239407 A1 * | 9/2010 | Mills | A47G 19/10 414/800 |
| 2011/0220767 A1 | 9/2011 | Stewart et al. | |
| 2012/0112023 A1 | 5/2012 | Tollman | |
| 2015/0230637 A1 * | 8/2015 | Kart | A47G 19/10 220/575 |
| 2016/0022064 A1 * | 1/2016 | Gonterman | A47G 19/02 220/574.1 |
| 2016/0331163 A1 | 11/2016 | Handerhan | |
| 2018/0213979 A1 | 8/2018 | Dumler et al. | |
| 2018/0343826 A1 | 12/2018 | Kumar et al. | |

FOREIGN PATENT DOCUMENTS

| | | |
|---|---|---|
| CN | 201160719 Y | 12/2008 |
| CN | 201192231 Y | 2/2009 |
| CN | 102429518 A | 5/2012 |
| CN | 203059154 U | 7/2013 |
| CN | 103622411 A | 3/2014 |
| CN | 203809488 U | 9/2014 |
| CN | 204232749 U | 4/2015 |
| CN | 105310392 A | 2/2016 |
| CN | 205338433 U | 6/2016 |
| CN | 106618043 A | 5/2017 |
| CN | 106724528 A | 5/2017 |
| CN | 107280367 A | 10/2017 |
| CN | 107468002 A | 12/2017 |
| JP | H0928540 A | 2/1997 |
| JP | 2001054479 A | 2/2001 |
| JP | 2006061653 A | 3/2006 |
| JP | 2006064168 A | 3/2006 |
| JP | 2008116046 A | 5/2008 |
| WO | 2006138335 A3 | 5/2007 |
| WO | 2015079258 A2 | 6/2015 |
| WO | 2018211518 A1 | 11/2018 |
| WO | 2018211520 A1 | 11/2018 |

* cited by examiner

NON-SLIP CONTAINER WITH HIDDEN SUCTION CUP

FIELD OF TECHNOLOGY

This disclosure relates generally to containers and more particularly, to a non-slip container with the hidden suction cup.

BACKGROUND

A container (e.g., a bowl, a dish, a cup) may be any object used to hold something. For example, the container may hold items such as baby food. The container may be placed on any surface (e.g., flat, curved etc.) when in use. Contents of the container may spill if the container becomes imbalanced.

For example, the container may tip over when it is accidentally knocked over (e.g., by a baby). Sometimes, the baby may try to use his/her intelligence to play or move the container. In the process, the baby may flip the container. A parent often wishes to secure the container onto the desired surface. Spills of the container can lead to a lot of frustration for the parent, and to the satisfaction of a grumpy and hungry baby.

SUMMARY

The disclosed invention presents a non-slip container with the hidden suction cup. In one aspect, a container includes a storage space, a suction cup, solid core, suction mechanism and a release tab. The solid core is placed directly above the suction cup in the storage space. The suction mechanism is positioned in a sectional gap of the container under the solid core. The suction mechanism enables the container to adhere with a surface on which the container is affixed.

The release tab of the suction mechanism is accessible from the strategically placed area of the container. The release tab is positioned under the solid core and fully vertically flushes with the container. The release tab is encompassed in the sectional gap under the container. The release tab enables a user to detach the container from the surface when the release tab is lifted upward from the surface.

In addition, the release tab may be inaccessible from other portions of the container. A location of the release tab may prevent the user from detaching the container from the surface. A perimeter and underlying structural ribs of the container may sit flush to the surface when the suction mechanism is engaged. The container may be significantly secured to the surface when the suction mechanism is engaged.

The sectional gap may not be visible from certain angles of the container. The solid core may be depressible by the user to secure the container with the surface by engaging the suction mechanism below the solid core. The suction mechanism may expand outward and adhere to the surface when a force is applied on a top portion of the solid core that is perpendicular to the surface.

The container may be an infant food container, an elderly food container, a drink storage container, a bowl, a single plate, a divided plate, a hospital container, a writing instrument holder, an electronic accessory holder, a bathroom accessory holder, a kitchen accessory holder, a bird feeder, a car accessory holder, a plane accessory holder, and/or a semi-secure desk accessory storing a pen, a stationary, a utensil, and/or a paper clip. The suction cup may have a circular form, approximately twice as wide in diameter as a length and/or a width of the solid core. The surface may be a table, a high chair, a food tray, a moving surface, and/or a vehicular surface.

In another aspect, a container includes a first storage space, a second storage space, a solid core, a suction mechanism, and a release tab. The solid core is placed between the first storage space and the second storage space. The suction mechanism is positioned in a sectional gap in a rear portion of the container under the solid core. The suction mechanism enables the container to adhere with a surface on which the container is affixed.

The release tab of the suction mechanism is accessible from the rear portion of the container. The release tab is positioned under the solid core and fully vertically flushes with a rear plane of the container. The release tab is encompassed in the sectional gap under the container. The release tab enables a user to detach the container from the surface when the release tab is lifted upward from the surface on which the container is affixed.

The position of the release tab may prevent the user from detaching the container from a front portion of the container. The entire container may sit flush with the surface when the suction mechanism is engaged in a manner such that the container is secured to the surface.

In yet another aspect, a container includes a solid core, a suction mechanism, and a release tab. The solid core is connecting a first storage space and a second storage space. The suction mechanism is positioned in a sectional gap in a rear portion of the container under the solid core. The suction mechanism enables the container to adhere with a surface on which the container is affixed.

The release tab of the suction mechanism is accessible from the rear portion of the container under the solid core and fully vertically flush with a rear plane of the container. The release tab is encompassed in the sectional gap under the container. The release tab enables a user to detach the container from the surface when the release tab is lifted upward from the surface on which the container is affixed. The container is formed with a single mold of a biodegradable material, a polyethylene material, and/or a synthetic material.

The container may be a food tray for a human infant designed to prevent overturning and/or sliding of the container from the surface. A pair of arms of the human infant may not be long enough to access the release tab when the human infant sits in front of the container to eat. The release tab may be accessible only from the opposite portion of the container.

In a further aspect, a container includes a suction mechanism and a release tab. The suction mechanism is fully encompassed in a sectional gap under the container and under a solid core securing two cups of the container. The release tab of the suction mechanism is inaccessible from a front portion of the container. The solid core is depressible by a user to secure the container to a surface by engaging the suction mechanism directly below the solid core. The suction mechanism expands outward and adheres to the surface when a force is applied on a top portion of the solid core that is perpendicular to the surface.

BRIEF DESCRIPTION OF THE FIGURES

The embodiments of this disclosure are illustrated by way of example and not limitation in the figures of the accompanying drawings, in which like references indicate similar elements and in which.

Figure 1A:
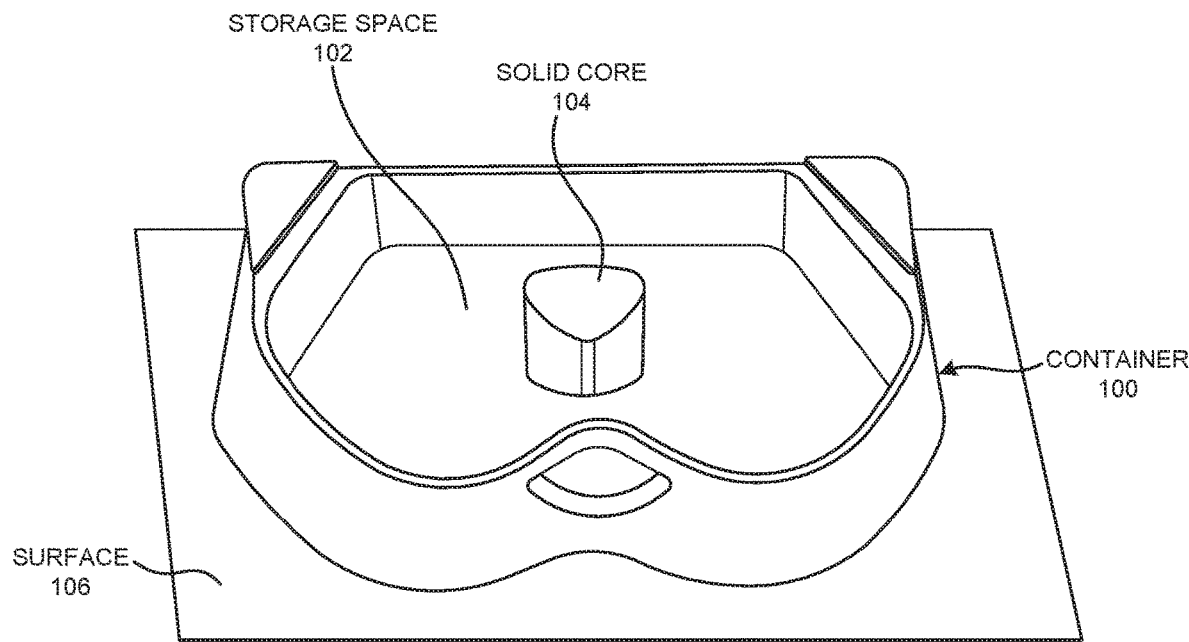
FIG. 1A is a front structural view of a container, according to one embodiment.

Other features of the present embodiments will be apparent from accompanying drawings and from the disclosure that follows.

DETAILED DESCRIPTION

The disclosed invention presents a non-slip container 100 with the hidden suction cup 108. In one embodiment, a container 100 includes a storage space 102, a suction cup 108, solid core 104, suction mechanism 200 and a release tab 112. The solid core 104 is placed directly above the suction cup 108 in the storage space 102. The suction mechanism 200 is positioned in a sectional gap 110 of the container 100 under the solid core 104. The suction mechanism 200 (e.g., using suction cup 108) enables the container 100 to adhere to a surface 106 on which the container 100 is affixed.

The release tab 112 of the suction mechanism 200 is accessible from the strategically placed area (e.g., rear portion 400 and/or front portion 304) of the container 100. The release tab 112 is positioned under the solid core 104 and fully vertically flushes with the container 100. The release tab 112 is encompassed in the sectional gap 110 under the container 100. The release tab 112 enables a user 202 to detach the container 100 from the surface 106 when the release tab 112 is lifted upward from the surface 106.

In addition, the release tab 112 may be inaccessible from other portions (e.g., front portion 304 and/or rear portion 400) of the container 100. A location of the release tab 112 may prevent the user 202 from detaching the container 100 from the surface 106. A perimeter 114 and underlying structural ribs 116 of the container 100 may sit flush with the surface 106 when the suction mechanism 200 is engaged. The container 100 may be significantly secured to the surface 106 when the suction mechanism 200 is engaged.

The sectional gap 110 may not be visible from certain angles of the container 100. The solid core 104 may be depressible by the user 202 to secure the container 100 with the surface 106 by engaging the suction mechanism 200 below the solid core 104. The suction mechanism 200 may expand outward and adhere to the surface 106 when a force 204 is applied to a top portion of the solid core 104 that is perpendicular to the surface 106.

The container 100 may be an infant food container, an elderly food container, a drink storage container, a bowl, a single plate, a divided plate, a hospital container, a writing instrument holder, an electronic accessory holder, a bathroom accessory holder, a kitchen accessory holder, a bird feeder, a car accessory holder, a plane accessory holder, and/or a semi-secure desk accessory storing a pen, a stationary, a utensil, and/or a paper clip. The suction cup 108 may have a circular form, approximately twice as wide in diameter as a length and/or a width of the solid core 104. The surface 106 may be a table, a high chair, a food tray, a moving surface, and/or a vehicular surface.

In another embodiment, a container 100 includes a first storage space 300, a second storage space 302, a solid core 104, a suction mechanism 200, and a release tab 112. The solid core 104 is placed between the first storage space 300 and the second storage space 302. The suction mechanism 200 is positioned in a sectional gap 110 in a rear portion 400 of the container 100 under the solid core 104. The suction mechanism 200 (e.g., using suction cup 108) enables the container 100 to adhere to a surface 106 on which the container 100 is affixed.

The release tab 112 of the suction mechanism 200 is accessible from the rear portion 400 of the container 100. The release tab 112 is positioned under the solid core 104 and fully vertically flushes with a rear plane of the container 100. The release tab 112 is encompassed in the sectional gap 110 under the container 100. The release tab 112 enables a user 202 to detach the container 100 from the surface 106 when the release tab 112 is lifted upward from the surface 106 on which the container 100 is affixed.

The position of the release tab 112 may prevent the user 202 from detaching the container 100 from a front portion 304 of the container 100. The entire container 100 may sit flush with the surface 106 when the suction mechanism 200 is engaged in a manner such that the container 100 is secured to the surface 106.

In yet another embodiment, a container 100 includes a solid core 104, a suction mechanism 200, and a release tab 112. The solid core 104 is connecting a first storage space 300 and a second storage space 302. The suction mechanism 200 is positioned in a sectional gap 110 in a rear portion 400 of the container 100 under the solid core 104. The suction mechanism 200 enables the container 100 to adhere with a surface 106 on which the container 100 is affixed.

The release tab 112 of the suction mechanism 200 is accessible from the rear portion 400 of the container 100 under the solid core 104 and fully vertically flush with a rear plane of the container 100. The release tab 112 is encompassed in the sectional gap 110 under the container 100. The release tab 112 enables a user 202 to detach the container 100 from the surface 106 when the release tab 112 is lifted upward from the surface 106 on which the container 100 is affixed. The container 100 is formed with a single mold of a biodegradable material, a polyethylene material, and/or a synthetic material.

The container 100 may be a food tray for a human infant (e.g., user 202) designed to prevent overturning and/or sliding of the container 100 from the surface 106 when the human infant (e.g., user 202) sits in front of the container 100 to eat because a pair of arms of the human infant (e.g., user 202) are not long enough to access the release tab 112 accessible only from the opposite portion (e.g., rear portion 400) of the container 100.

In a further embodiment, a container 100 includes a suction mechanism 200 and a release tab 112. The suction mechanism 200 is fully encompassed in a sectional gap 110 under the container 100 and under a solid core 104 securing two cups of the container 100. The release tab 112 of the suction mechanism 200 is inaccessible from a front portion 304 of the container 100. The solid core 104 is depressible by a user 202 to secure the container 100 to a surface 106 by engaging the suction mechanism 200 directly below the solid core 104. The suction mechanism 200 expands outward and adheres to the surface 106 when a force 204 is applied on a top portion of the solid core 104 that is perpendicular to the surface 106.

FIG. 1A is a front structural view 150A of a container 100, according to one embodiment. FIG. 1A shows a container 100, a storage space 102, a solid core 104, and a surface 106, according to one embodiment.

The container 100 may be a solid object adherable with any surface (e.g., surface 106) and deep enough to hold an item (e.g., baby food, liquid, accessory, etc.). The container 100 may be significantly secured to any flat and/or curved surface (e.g., surface 106). The container 100 may be hard to move when adhered to the surface 106. The container 100 may not get imbalanced when adhered with the surface 106 even after externally pushed and/or pulled by the user 202. The container 100 may sit flush when adhered to the surface 106. A user 202 may not get his fingers underneath the container 100 when the container 100 sits flush with the surface 106.

The container 100 may include a single (e.g., storage space 102) and/or multiple storage spaces (e.g., first storage space 300 and second storage space 302), a suction cup 108, a solid core 104, a suction mechanism 200, and a release tab 112. The container 100 may adhere with the surface 106 when the solid core 104 is pressed by the user 202. The container 100 may have a hidden suction cup 108 positioned underneath the container 100 to adhere with the surface 106. The container 100 may be detached from the surface 106 using the release tab 112. The location of the release tab 112 may prevent the user 202 from detaching the container 100 from other portions (e.g., front portion 304 and/or rear portion 400) of the container 100.

The container 100 may be formed with a single mold of a biodegradable material, a polyethylene material, and/or a synthetic material. The container 100 may also be made of a glass, a metal, a wood, plastic, and/or a silicon etc. material. The container 100 may have a square, a round, a triangular and/or an asymmetric shape. In one example embodiment, the container 100 may be an infant food container, an elderly food container, a drink storage container, a bowl, a single plate, a divided plate, a hospital container, a writing instrument holder, an electronic accessory holder, a bathroom accessory holder, a kitchen accessory holder, a bird feeder, a car accessory holder, a plane accessory holder, and/or a semi-secure desk accessory.

In another embodiment, the container 100 may be a food tray for a human infant (e.g., user 202) designed to prevent overturning and/or sliding of the container 100 from the surface 106. A pair of arms of the human infant (e.g., user 202) may not be long enough to access the release tab 112 when the human infant (e.g., user 202) sits in front of the container 100 to eat. The release tab 112 may be accessible only from the opposite portion (e.g., front portion 304 and/or rear portion 400) of the container 100.

The storage space 102 of the container 100 may be a hollow space for storing an item(s). The solid core 104 may be placed at the center of the storage space 102. The container 100 may have a single storage space (e.g., the storage space 102) and/or multiple storage spaces (e.g., the first storage space 300 and the second storage space 302) based on the application of the container 100. The user 202 may be able to store and/or carry infant food, a pen, a stationary, a utensil, and/or a paper clip etc. in the storage space 102 of the container 100.

The solid core 104 may be a central rigid part of the container 100 that enables the container 100 to adhere with the surface 106. The solid core 104 may be placed at the center of the storage space 102 and/or between the multiple storage spaces (e.g., the first storage space 300 and the second storage space 302). The solid core 104 may be directly positioned above the suction cup 108 of the suction mechanism 200. The solid core 104 may be depressible by the user 202 to secure the container 100 with the surface 106. A force 204 (e.g., perpendicular to the surface 106) applied on a top portion of the solid core 104 may engage the suction mechanism 200 of the container 100 with the surface 106.

The surface 106 may be an exterior of a plane on which the container 100 is affixed. The surface 106 may be a flat and/or a curved plane. The surface 106 may be a table, a high chair, a food tray, a moving surface, an unstable surface, and/or a vehicular surface. The container 100 may adhere with the surface 106 when the solid core 104 is pressed by the user 202. The container 100 may be detached from the surface 106 when the release tab 112 is lifted upward from the surface 106.

Figure 1B:
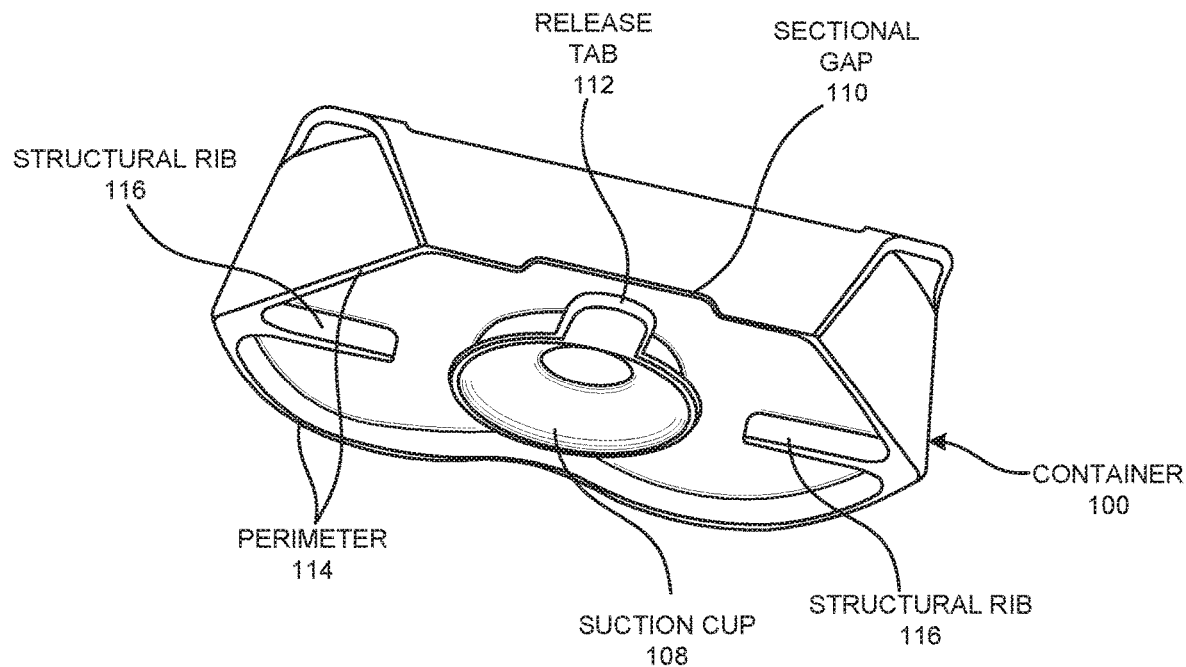
FIG. 1B is a rear structural view of the container of FIG. 1A, according to one embodiment.

FIG. 1B is a rear structural view 150B of the container 100 of FIG. 1A, according to one embodiment. FIG. 1B shows a suction cup 108, a sectional gap 110, a release tab 112, a perimeter 114, and a structural rib 116, according to one embodiment.

The suction cup 108 may be an object that uses the negative fluid pressure of air and/or water to adhere to the surface 106 by creating a vacuum. The vacuum created in the suction cup 108 may enable the suction cup to affix the container 100 onto the surface 106. The suction cup 108 may be positioned under the solid core 104 of the container 100. The suction cup 108 may be hidden underneath the container 100. The size of suction cup 108 may extend below the perimeter 114 of the container 100. The suction cup 108 may allow the container 100 to adhere with the surface 106.

The force 204 applied on the top portion of the solid core 104 may affix the suction cup 108 of the container 100 with the surface 106. The suction cup 108 may expand outward and adhere to the surface 106 when the force 204 (e.g., perpendicular to the surface 106) is applied to the top portion of the solid core 104. The suction cup 108 may have a circular form. The circular form of the suction cup 108 may be approximately twice as wide in diameter as a length and/or a width of the solid core 104. The size of the suction cup 108 of the suction mechanism 200 may be directly proportional to the size of the container 100.

The sectional gap 110 may be an opening in a particular section in the solid body of the container 100. The sectional gap 110 may enable the user 202 to access the release tab 112 of the container 100. The sectional gap 110 may not be visible from certain angles of the container 100. The suction mechanism 200 and the release tab 112 may be encompassed in the sectional gap 110. The release tab 112 in the sectional gap 110 may enable the user 202 to detach the container 100. The release tab 112 may enable the user 202 to negate the effect of the vacuum created in the suction cup 108. The sectional gap 110 may be positioned at the front portion 304 and/or the rear portion 400 of the container 100.

The release tab 112 may be a small flap projecting from the suction cup 108 to disengage the suction mechanism 200 of the container 100 from the surface 106. The release tab 112 may enable the user 202 to detach the container 100 when the release tab 112 is lifted upward from the surface 106. The release tab 112 may be enclosed in the sectional gap 110 under the container 100. The release tab 112 may be fully vertically flush with the container 100. The release tab 112 of the suction mechanism 200 may be accessible from the strategically placed area (e.g., rear portion 400 and/or front portion 304) of the container 100. The release tab 112 may be inaccessible from opposite side (e.g., front portion 304 and/or rear portion 400) of the container 100. The release tab 112 may be positioned in the sectional gap 110 of the front portion 304 and/or the rear portion 400 of the container 100.

The perimeter 114 may be a bottom outer edge of the container 100 that sits flush to the surface 106 when the suction mechanism 200 is engaged. The user 202 may not get his fingers underneath the perimeter 114 of the container 100 when the container 100 is secured to the surface 106. The structural rib 116 may be a raised support of the bottom surface of the container 100. The structural rib 116 may sit flush with the surface 106 when the suction mechanism 200 is engaged.

Figure 2A:
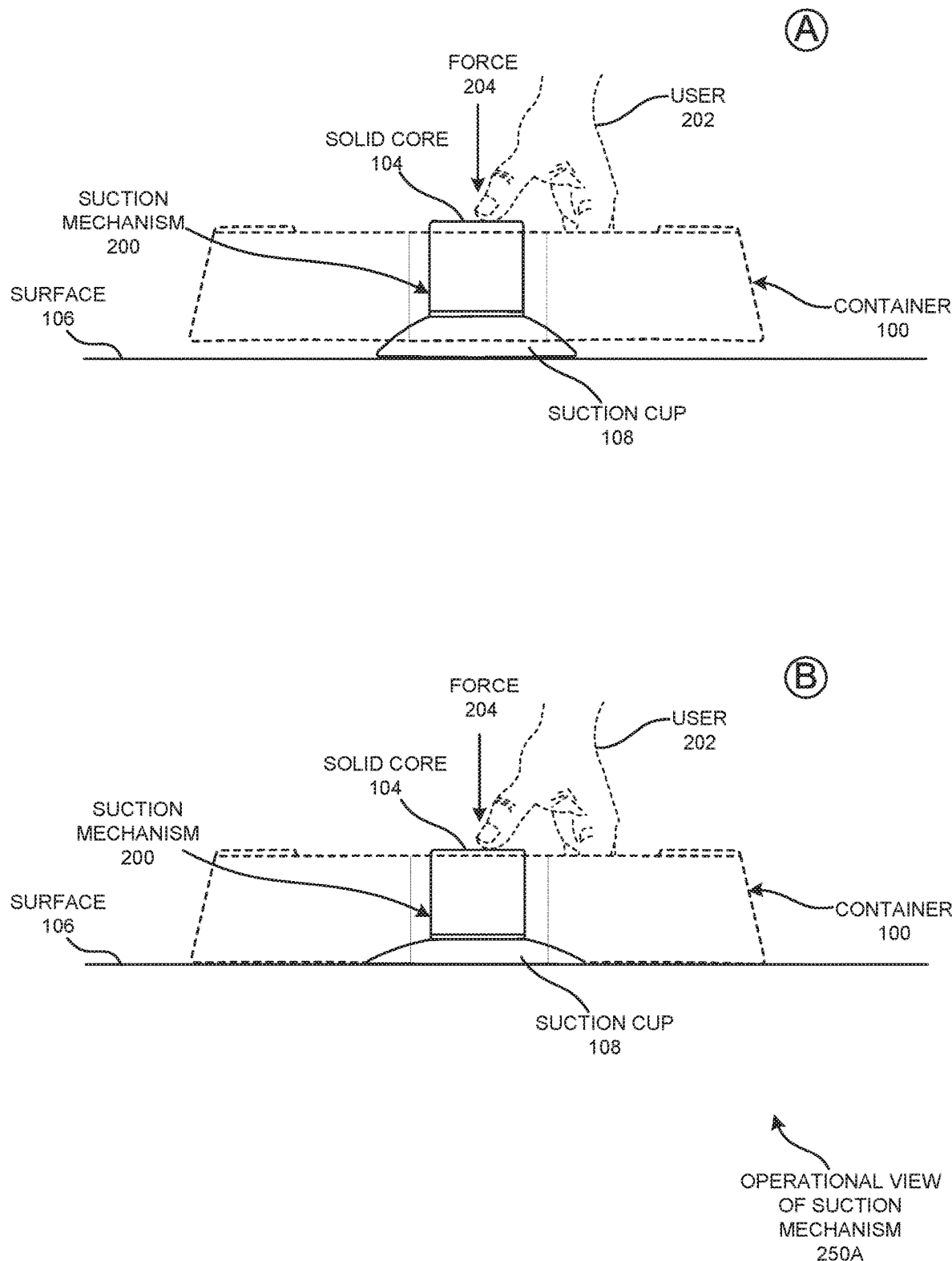
FIG. 2A is an operational view of a suction mechanism of the container of FIG. 1A-B illustrating function of the suction mechanism, according to one embodiment.

FIG. 2A is an operational view 250A of a suction mechanism 200 of the container 100 of FIG. 1A-B illustrating function of the suction mechanism 200, according to one embodiment. FIG. 2A shows a suction mechanism 200, a user 202, and a force 204, according to one embodiment. FIG. 2A illustrates the function of the suction mechanism 200 such that when the user 202 applies the force 204 on the top portion of the solid core 104 (e.g., perpendicular to the surface 106), the suction cup 108 may expand outward and adhere to the surface 106.

The suction mechanism 200 may be a structure that allows the container 100 to adhere with the surface 106. The suction mechanism 200 may include the solid core 104, the suction cup 108, and the release tab 112. The solid core 104 may be positioned above the suction cup 108 of the suction mechanism 200. The suction cup 108 of the suction mechanism 200 may adhere with the surface 106 when the force 204 (e.g., perpendicular to the surface 106) applied on the top portion of the solid core 104. The suction cup 108 may expand outward creating a vacuum inside the suction cup 108 when the force 204 is applied on a top portion of the solid core 104. The vacuum created may enable the suction cup 108 of suction mechanism 200 to adhere with the surface 106. The entire container 100 may sit flush with the surface 106 when the suction mechanism 200 is engaged in a manner such that the container 100 is secured to the surface 106.

The user 202 may be a person (e.g., a patient, a traveler, a driver, an oldster, a parent, and/or an infant, etc.) using the container 100. The user 202 may attach the container 100 with the surface 106 by applying force 204 (e.g., perpendicular to the surface 106) on the top portion of the solid core 104. The user 202 may not get his fingers underneath the container 100 when the container 100 is secured to the surface 106. The user 202 may not be able to move the container 100 when the container 100 adheres with the surface 106. A location of the release tab 112 may prevent the user 202 from detaching the container 100 from the surface 106. The user 202 may detach the container 100 from the surface 106 when the release tab 112 is lifted upward from the surface 106.

The force 204 may be a power applied on the top portion of the solid core 104 to engage the suction mechanism 200 of the container 100 with the surface 106. The force 204 may be applied by the user 202 to adhere the container 100 with the surface 106. The direction of force 204 applied by the user 202 may be perpendicular to the surface 106.

Figure 2B:
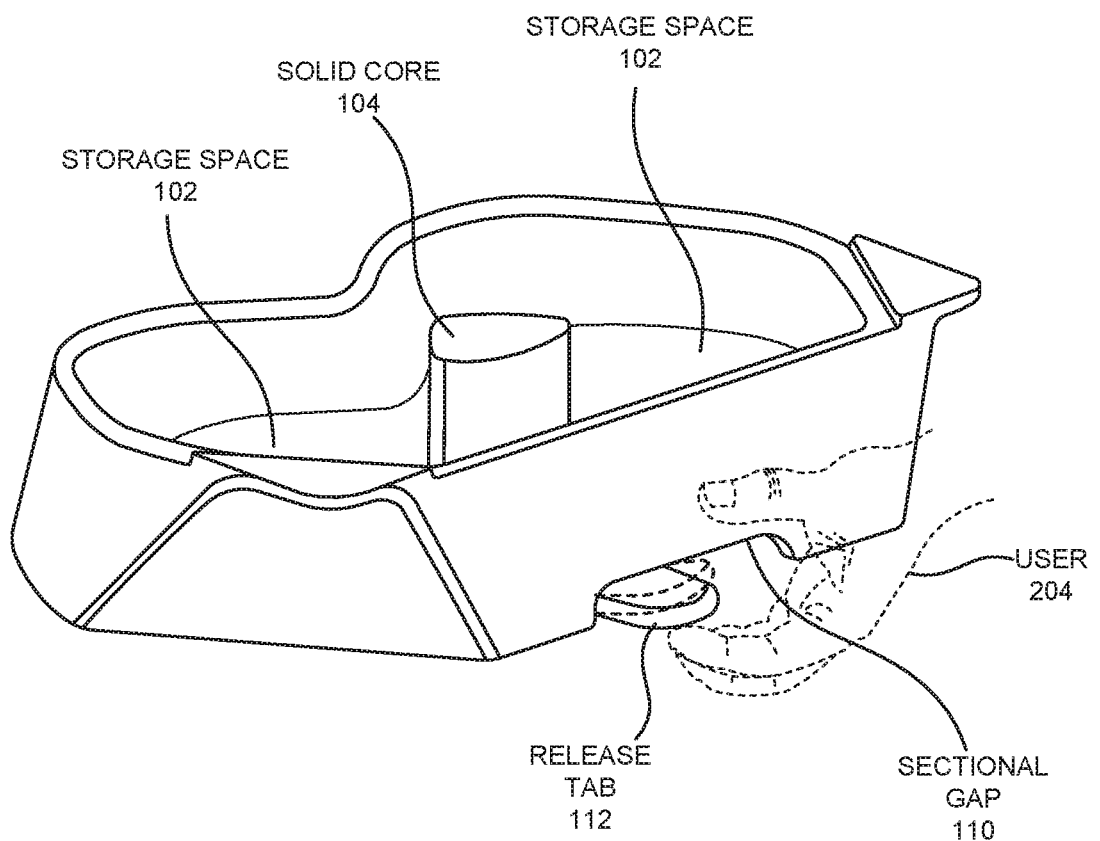
FIG. 2B is an operational view of a release tab of the container of FIG. 1A-B illustrating function of the release tab, according to one embodiment.

FIG. 2B is an operational view 250B of the release tab 112 of the container 100 of FIG. 1A-B illustrating function of the release tab 112, according to one embodiment. FIG. 2B illustrates the function of the release tab 112 such that when the user 202 lifts the release tab 112 upward from the surface 106, the container 100 gets detached from the surface 106.

Figure 3:
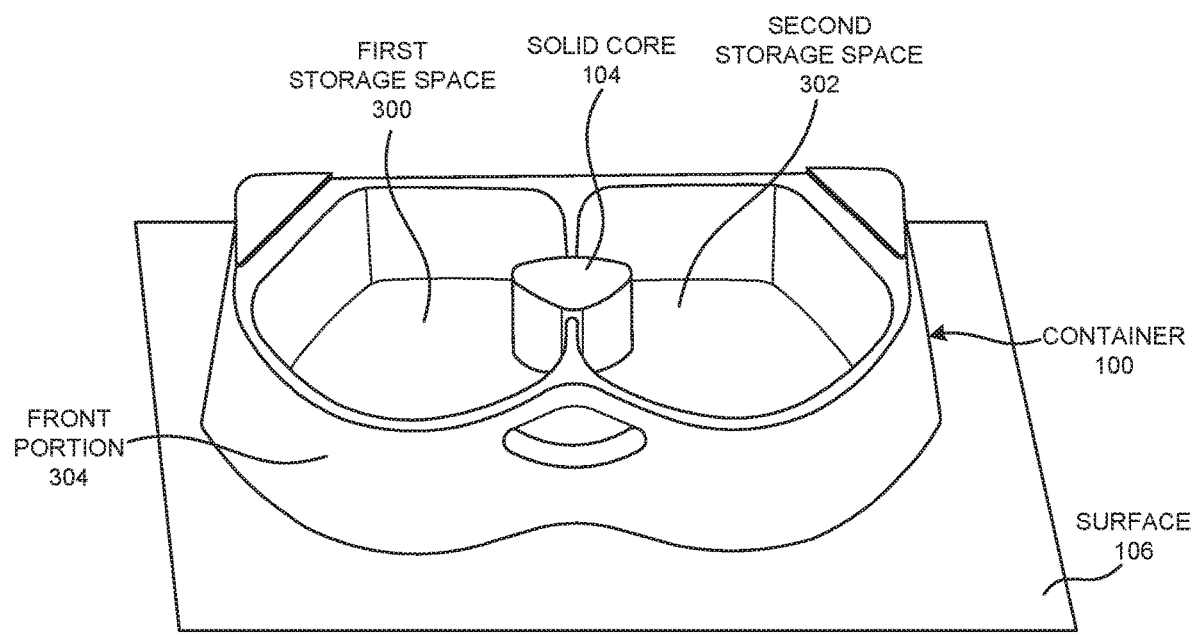
FIG. 3 is a front structural view of a container of FIG. 1A-B with multiple storage spaces, according to one embodiment.

FIG. 3 is a front structural view 350 of the container 100 of FIG. 1A-B with multiple storage spaces (e.g., the first storage space 300 and the second storage space 302), according to one embodiment. FIG. 3 shows a first storage space 300, a second storage space 302, and a front portion 304, according to one embodiment.

The first storage space 300 and the second storage space 302 may be hollow spaces for storing an item(s) in the container 100. The user 202 may store and/or carry infant food, a pen, a stationary, a utensil, and/or a paper clip etc. in the first storage space 300 and the second storage space 302 of the container 100. The front portion 304 may be a forepart of the container 100 that is directly visible to the user 202. The front portion 304 of the container 100 may sit flush with the surface 106 when the suction mechanism 200 is engaged. The user 202 may not get his fingers underneath the container 100 from the front portion 304 when the container 100 is secured to the surface 106. In one embodiment, the release tab 112 of the suction mechanism 200 may be positioned in the sectional gap 110 of the front portion 304 of the container 100.

Figure 4:
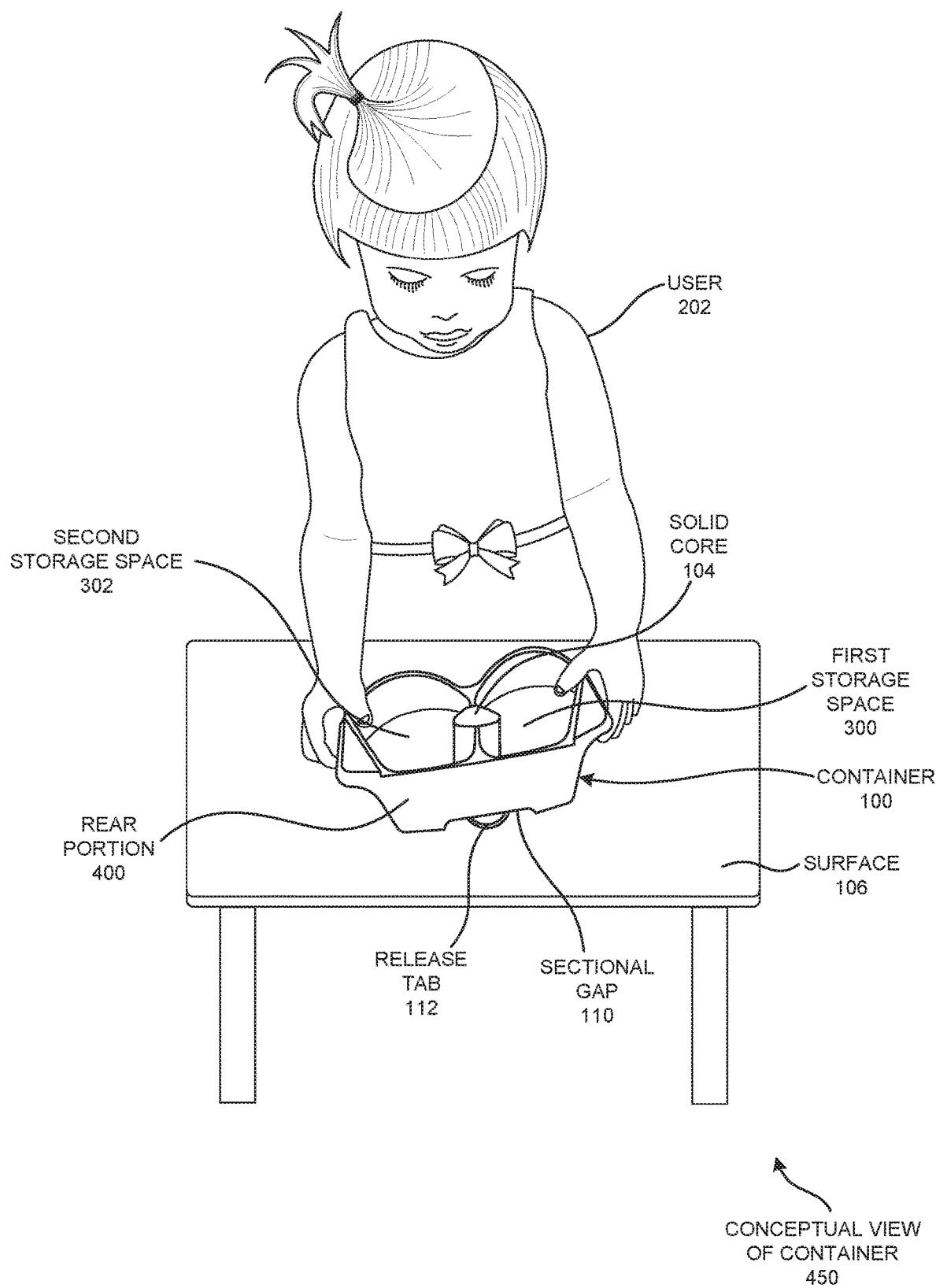
FIG. 4 is a conceptual view of the container of FIG. 1A-B illustrating the function of the suction mechanism of the container making it difficult to remove from the surface, according to one embodiment.

FIG. 4 is a conceptual view 450 of the container 100 of FIG. 1A-B illustrating the function of the suction mechanism 200 of the container 100 making it difficult to remove from the surface 106, according to one embodiment. FIG. 4 shows a rear portion 400, according to one embodiment.

The rear portion 400 may be a back-end side of the container 100 that is not directly visible to the user 202. The release tab 112 of the suction mechanism 200 may be accessible from the rear portion 400 of the container 100. In another embodiment, the release tab 112 of the suction mechanism 200 may be positioned in the sectional gap 110 of the rear portion 400 of the container 100.

An example embodiment will now be described. Jane Doe may be a housewife and working in ACME Software Company in the United States of America. Jane Doe may have an infant daughter. Jane Doe may have to feed her daughter before leaving for work. While feeding, Jane's daughter may try to play with the container. Jane's daughter may spill her baby food a number of times while playing with the container, wasting her food and making the place dirty. This may have led to a lot of frustration to Jane. Every time the container spills, Jane may have to clean the place before leaving for work. This often may have led Jane to reach late to her office. In addition, wastage of baby food may have increased her expenses.

Jane Doe may have been advised by her family friend to use the non-slip container 100 with the hidden suction cup 108 as described in the various embodiments of FIGS. 1-4. Jane Doe may have used the non-slip container 100 as described in the various embodiments of FIGS. 1-4 and found it to be very useful. Jane Doe may be able to adhere the container 100 to her daughter's high chair by applying force 204 to the solid core 104 of the container 100 as described in the various embodiments of FIGS. 1-4. Jane may have observed that her daughter is unable to remove the container 100 while eating even with substantial pulling and/or pushing of the container 100. Jane may now be able to serve her baby food without being concerned of its wastage. Jane Doe may feed her baby without spilling out the baby food from the container 100 as described in the various embodiments of FIGS. 1-4.

The various embodiments of FIGS. 1-4 of the non-slip container 100 with the hidden suction cup 108 may have helped Jane Doe to manage her time efficiently and reach office before time as well. Jane may now be satisfied that her baby is fed well, making her happy.

A number embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps, data points and factors may be provided, or steps, data points and factors may be eliminated, from the described flows, and other components may be added to, or removed from, the described systems. Accordingly, other embodiments may within the scope of the following disclosure and/or claims.

It may be appreciated that the various systems, methods, and apparatus disclosed herein may be embodied in a machine-readable medium and/or a machine accessible medium compatible with a data processing system (e.g., a computer system), and/or may be performed in any order.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A container, comprising:
   a storage space;
   a suction cup;
   a solid core encompassed substantially within an interior cavity of the storage space such that a top surface of the solid core extends above an upper plane of the container proportionately with an expected displacement distance of the suction cup underneath the container;
   a suction mechanism in a sectional gap of the container under the solid core to enable the container to adhere with a surface on which the container is affixed; and
   a release tab of the suction mechanism accessible from a strategically placed area of the container under the solid core and fully vertically flush with the container such that it is encompassed in the sectional gap under the container,
     wherein the release tab to enable a user to detach the container from the surface when the release tab is lifted upward from the surface.

2. The container of claim 1 wherein the release tab to be inaccessible from other portions of the container.

3. The container of claim 2 wherein a location of the release tab to prevent the user from detaching the container from the surface.

4. The container of claim 1 wherein a perimeter and underlying structural ribs of the container to sit flush to the surface when the suction mechanism is engaged in a manner such that the container is significantly secured to the surface.

5. The container of claim 4 wherein the sectional gap is not visible from certain angles of the container.

6. The container of claim 1 wherein the solid core is depressible by the user to secure the container to the surface by engaging the suction mechanism below the solid core to expand outward and adhere to the surface when a force is applied on a top portion of the solid core that is perpendicular to the surface.

7. The container of claim 1 wherein the container is any one of an infant food container, an elderly food container, a drink storage container, a bowl, a single plate, a divided plate, a hospital container, a writing instrument holder, an electronic accessory holder, a bathroom accessory holder, a kitchen accessory holder, a bird feeder, a car accessory holder, a plane accessory holder, and a semi-secure desk accessory storing at least one or more of a pen, a stationary, a utensil, and a paper clip.

8. The container of claim 1 wherein the suction cup has a circular form and is approximately twice as wide in diameter as either one of a length and a width of the solid core.

9. The container of claim 1 wherein the surface is any one of a table, a high chair, a food tray, a moving surface, and a vehicular surface.

10. A container, comprising:
    a first storage space;
    a second storage space;
    a solid core placed at a center portion between the first storage space and the second storage space;
    wherein the solid core to physically extend above a linear plane of an upper portion of the container,
    a suction mechanism in a sectional gap in a rear portion of the container under the solid core to enable the container to adhere with a surface on which the container is affixed,
      wherein if a user of the container applies a force on a top portion of the solid core perpendicularly to a surface on which the container rests, the suction mechanism enables a suction cup of the suction mechanism to expand outward creating a vacuum inside the suction cup when the force is applied on the top portion of the solid core,
      wherein the solid core to physically extend above a linear plane of an upper portion of the container physically extending above the linear plane of the upper portion of the container,
      wherein if the force is applied on the top portion of the solid core, the suction cup of the suction mechanism to adhere with the surface on which the container rests, and
    wherein a first relative displacement of a height of the solid core extending above the container is proportional to a second relative displacement of a compression of the suction cup in which the vacuum is formed when the top portion of the solid core is depressed; and
    a release tab of the suction mechanism accessible from the rear portion of the container under the solid core and fully vertically flush with a rear plane of the container such that it is encompassed in the sectional gap under the container,
      wherein the release tab to enable a user to detach the container from the surface when the release tab is lifted upward from the surface on which the container is affixed.

11. The container of claim 10 wherein the release tab to be inaccessible from a front portion of the container.

12. The container of claim 11 wherein the position of the release tab to prevent the user from detaching the container from the front portion of the container.

13. The container of claim 10 wherein the entire container to sit flush with the surface when the suction mechanism is engaged in a manner such that the container is secured to the surface.

14. A container, comprising:
    a solid core placed at a center portion between a first storage space and a second storage space, wherein the solid core to physically extend above a linear plane of an upper portion of a container;

a suction mechanism in a sectional gap in a rear portion of the container under the solid core to enable the container to adhere with a surface on which the container is affixed,
- wherein if a user of the container applies a force on a top portion of the solid core perpendicularly to a surface on which the container rests, the suction mechanism enables a suction cup of the suction mechanism to expand outward creating a vacuum inside the suction cup when the force is applied on the top portion of the solid core,
- wherein the solid core to physically extend above a linear plane of an upper portion of the container physically extending above the linear plane of the upper portion of the container,
- wherein if the force is applied on the top portion of the solid core, the suction cup of the suction mechanism to adhere with the surface on which the container rests, and wherein a first relative displacement of a height of the solid core extending above the container is proportional to a second relative displacement of a compression of the suction cup in which the vacuum is formed when the top portion of the solid core is depressed; and a release tab of the suction mechanism accessible from the rear portion of the container under the solid core and fully vertically flush with a rear plane of the container such that it is encompassed in the sectional gap under the container,
- wherein the release tab to enable a user to detach the container from the surface when the release tab is lifted upward from the surface on which the container is affixed, and
- wherein the container is formed with a single mold of any one of a biodegradable material, a polyethylene material, and a synthetic material.

15. The container of claim 14 wherein the release tab to be inaccessible from a front portion of the container and to prevent the user from detaching the container from the front portion of the container.

16. The container of claim 15 wherein the container is a food tray for a human infant designed to prevent overturning and sliding of the container from the surface when the human infant sits in front of the container to eat because a pair of arms of the human infant are not long enough to access the release tab accessible only from the opposite portion of the container.

17. The container of claim 14 wherein the solid core is depressible by the user to secure the container with the surface by engaging the suction mechanism directly below the solid core to expand outward and adhere to the surface when a force is applied on a top portion of the solid core that is perpendicular to the surface.

18. The container of claim 14 wherein the suction cup has a circular form and is approximately twice as wide in diameter as either one of a length and a width of the solid core.

19. A container, comprising:
- a solid core to physically extend above a linear plane of an upper portion of the container;
- a suction mechanism fully encompassed in a sectional gap under the container and under the solid core securing two cups of the container,
- wherein a first relative displacement of a height of the solid core extending above the container is proportional to a second relative displacement of a compression of a suction cup of the suction mechanism in which a vacuum is formed when a top portion of the solid core is depressed; and
- a release tab of the suction mechanism inaccessible from a front portion of the container,
  - wherein the solid core is depressible by a user to secure the container with a surface by engaging the suction mechanism directly below the solid core to expand outward and adhere to the surface when a force is applied on a top portion of the solid core that is perpendicular to the surface.

20. The container of claim 19 wherein the release tab to enable the user to detach the container from the surface when the release tab is lifted upward from the surface.

* * * * *